United States Patent
Wu et al.

(10) Patent No.: US 7,537,304 B2
(45) Date of Patent: May 26, 2009

(54) APPARATUS AND METHODS FOR COLOR SENSOR CALIBRATION IN A MULTI-DIE PRINTER

(75) Inventors: Yifeng Wu, Vancouver, WA (US); Algird M. Gudaitis, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 268 days.

(21) Appl. No.: 11/413,292

(22) Filed: Apr. 28, 2006

(65) Prior Publication Data
US 2007/0252861 A1 Nov. 1, 2007

(51) Int. Cl.
*B41J 29/393* (2006.01)
(52) U.S. Cl. ......................................... 347/19
(58) Field of Classification Search ..................... 347/19
See application file for complete search history.

(56) References Cited

U.S. PATENT DOCUMENTS

| | | | | |
|---|---|---|---|---|
| 5,272,518 A | * | 12/1993 | Vincent | 356/405 |
| 5,691,817 A | * | 11/1997 | Cargill et al. | 356/405 |
| 6,494,558 B1 | * | 12/2002 | Doval et al. | 347/19 |
| 7,259,893 B2 | * | 8/2007 | Falk et al. | 358/2.1 |

FOREIGN PATENT DOCUMENTS

JP    2004-122411    *   4/2004

* cited by examiner

*Primary Examiner*—Julian D Huffman (57) ABSTRACT

Apparatus and methods for color calibrating low cost sensors in a printing system are disclosed. Exemplary embodiments include printing targets from multiple printhead die; making multiple readings of each target; fitting a curve to the acquired data; and generating calibration coefficients based on the fitted curve. Exemplary embodiments may include a generic calibration to map sensor measurements to a colorimetric color space, and a specific calibration to account for sensor-to-sensor variation.

19 Claims, 10 Drawing Sheets

APPARATUS AND METHODS FOR COLOR SENSOR CALIBRATION IN A MULTI-DIE PRINTER

FIELD OF INVENTION

This invention relates generally to apparatus and methods for calibrating a color sensor in a multi-die printing system.

BACKGROUND

Inkjet printing systems are also are well known in the art. Small droplets of liquid ink, propelled by thermal heating, piezoelectric actuators, or some other mechanism, are deposited by a printhead on a print media, such as paper.

In scanning-carriage inkjet printing systems, inkjet printheads are typically mounted on a carriage that is moved back and forth across the print media. As the printheads are moved across the print media, the printheads are activated to deposit or eject ink droplets onto the print media to form text and images. The print media is generally held substantially stationary while the printheads complete a "print swath", typically an inch or less in height; the print media is then advanced between print swaths. The need to complete numerous carriage passes back and forth across a page has meant that inkjet printers have typically been significantly slower than some other forms of printers, such as laser printers, which can essentially produce a page-wide image.

The ink ejection mechanisms of inkjet printheads are typically manufactured in a manner similar to the manufacture of semiconductor integrated circuits. The print swath for a printhead is thus typically limited by the difficulty in producing very large semiconductor chips or "die". Consequently, to produce printheads with wider print swaths, other approaches are used, such as configuring multiple printhead dies in a printhead module, such as a "page wide array". Print swaths spanning an entire page width, or a substantial portion of a page width, can allow inkjet printers to compete with laser printers in print speed.

One type of inkjet printing system utilizes multiple printhead modules that each print a substantial portion of a page width. The printhead modules in this type of system may include multiple printhead die linearly spaced across the print swath, such that each die prints a portion of the swath, typically one inch or less. Correcting for die-to-die variation in a printing system may be desirable, as well as correcting for overall color accuracy of the printer. One common method of color correction involves measuring printed test samples using a calibrated color sensor.

A problem with color calibration is to get accurate color measurements. When a built-in sensor is incorporated into the printer, the problem is made more difficult by cost constraints and memory requirements. A built-in sensor is typically a lower-cost device without the full capabilities of a spectrophotometer; typically, such devices may be non-linear with respect to a colorimetric color space, and may exhibit significant device-to-device variation. Limited memory in a printing system may also make storing large amounts of calibration data impracticable.

There is thus a need for apparatus and methods for calibrating color sensors in printing systems.

SUMMARY

Exemplary embodiments of the invention include apparatus and methods for color calibrating low cost sensors in a printing system. Exemplary embodiments include printing targets from multiple printhead die which print the same color ink; making multiple readings of each target; and generating calibration data based on the readings. Exemplary embodiments may include both a generic calibration to map generic sensor measurements to a colorimetric color space, and a specific calibration to account for sensor-to-sensor variation.

Other aspects and advantages of the present invention will become apparent from the following detailed description, taken in conjunction with the accompanying drawings, illustrating by way of example the principles of the invention.

DESCRIPTION OF EXEMPLARY EMBODIMENTS

Exemplary embodiments of are described with respect to an inkjet printing system; however, the invention is not limited to the exemplary system, nor to the field of inkjet printing, but may be utilized as well in other systems.

In the following specification, for purposes of explanation, specific details are set forth in order to provide an understanding of the present invention. It will be apparent to one skilled in the art, however, that the present invention may be practiced without these specific details. Reference in the specification to "one embodiment" or "an exemplary embodiment" means that a particular feature, structure, or characteristic described in connection with the embodiment is included in at least one embodiment. The appearance of the phrase "in one embodiment" in various places in the specification do not necessarily refer to the same embodiment.

Figure 1:
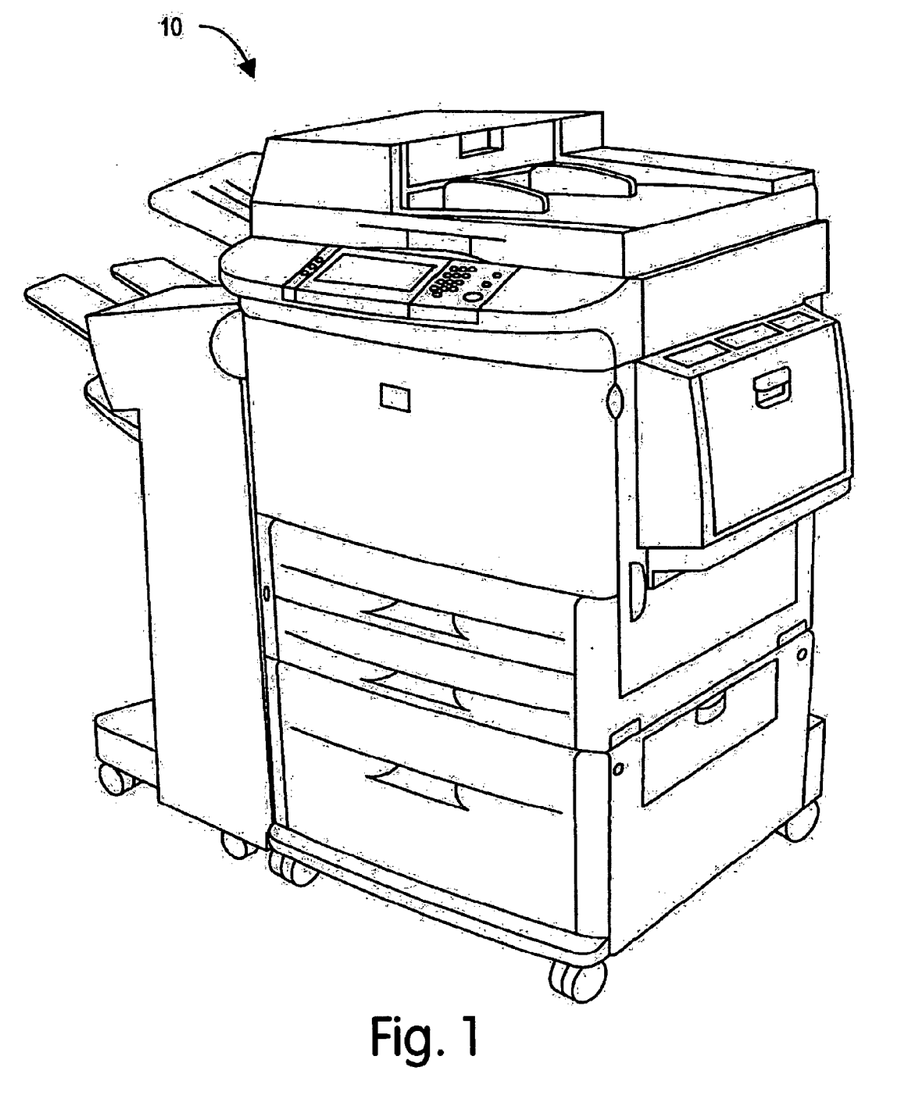
FIG. 1 illustrates an exemplary printing system in which exemplary embodiments of the invention may be utilized.

FIG. 1 illustrates an exemplary inkjet printing system 10 in which embodiments of the invention may be utilized. Intended for moderately high volume printing, the system may also include multiple other functions and may, for example, be connected to an office network to provide printing, scanning, and faxing capabilities to a workgroup. Methods of the invention may also be applied to other printing systems, such as those used for photo printing.

Figure 2:
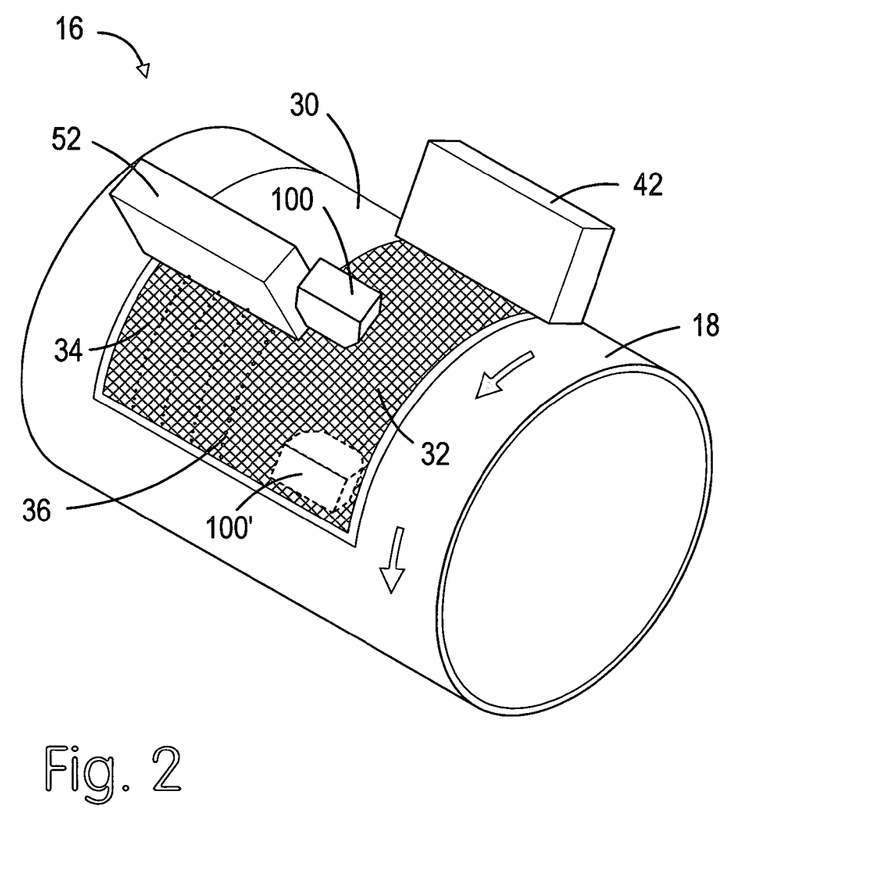
FIG. 2 illustrates the paper path and printhead mechanisms of an exemplary inkjet printing system in which exemplary embodiments of the invention may be utilized.

FIG. 2 illustrates the basic media path and printhead mechanisms 16 of an exemplary inkjet printing system 10 in which embodiments of the invention may be utilized. As shown in FIG. 2, print media 30, such as a sheet of paper, is held to a rotating drum 18 by air suction. The print media 30 is rotated past printhead assemblies on print carriages 42, 52 that remain substantially stationary during a printing pass (although the carriages may be repositioned between passes, such as to allow printing of wider media using multiple passes). Multiple carriages with printhead assemblies may be utilized to span the page width as illustrated; one printhead assembly on a first carriage 42 may print a first portion 32 of the page width, and a second printhead assembly on a second carriage 52 may print a second portion 34 of the page width. Where the two portions of the printed page meet is a joint 36, which ideally is not readily perceptible on the completed page.

The multiple printhead assemblies 42, 44 may in turn each comprise multiple separate printhead die, with each die positioned to print a portion of the total print swath, as further explained below. Print swath 34 is shown in FIG. 2 as comprising four smaller swaths, such as would be produced by four separate die on printhead assembly 52. The separate die may exhibit slight variations in dropweight, as discussed below.

For multi-pass printing, the print media 30 may be held to the drum 18 by suction for more than one complete revolution of the drum, with printheads on the carriage assemblies 42, 44 depositing ink during each pass of the print media. The printer may include drying mechanisms (not shown) to accelerate the drying of the printed media, which may, for example, be placed near the bottom of the drum 18 such that the printed media may be at least partially dried between printing passes. The carriage assemblies 42, 52 permit the printheads to be moved side-to-side to different locations on the drum or off the drum entirely for servicing, or to reposition the printheads for different paper configurations.

Also positioned adjacent to print drum 18 is a compact optical sensor system 100/100', described in detail below. In a similar manner to the printhead assemblies 42, 52, the compact optical sensor system 100/100' is also configured to be repositioned at different locations across the printhead drum, such that, for example, the optical characteristics of printed samples from different printhead die may be sampled. In some printing system embodiments, the compact optical sensor 100 may be located on the same carriage mechanism as one of the printhead assemblies 42, 52 to reduce system cost and complexity; in alternative system embodiments, the compact optical sensor 100' may be located a carriage mechanism separate from the printhead assemblies. To allow for drying of the media and for making multiple measurements, the print drum 18 may make one or more rotations before or between sensor readings.

Figure 3:
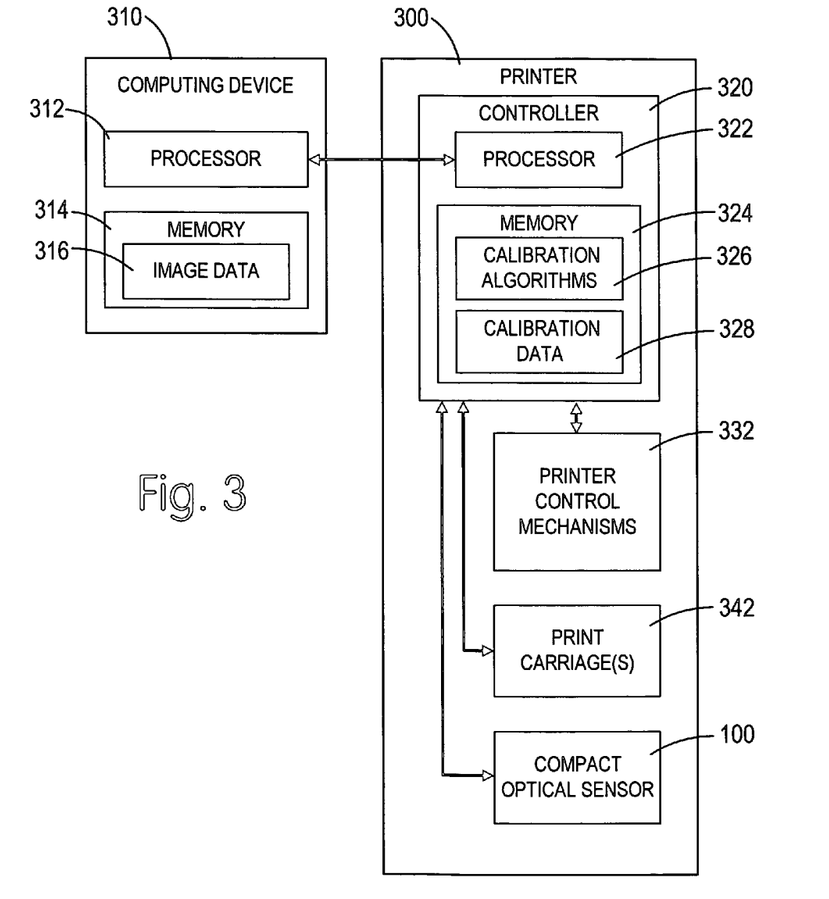
FIG. 3 is a block diagram further illustrating a system in which exemplary embodiments of the invention may be employed.

FIG. 3 is a schematic view of the exemplary inkjet printing system of FIGS. 1 and 2. Computing device 310 may be a computer directly connected to the printing system 300, or there may be multiple computers accessing the printing system over a network, such as a Local Area Network (LAN). Alternatively, some processing capabilities may be incorporated into the printer itself, such as in a photo printer. Computing device 310 typically includes a processor 312 having access to memory 314 including image data 316. The computing device 310 typically formats the image data in a form which may be utilized by printing system 300.

Printing system 300 typically includes a controller 320 which includes a processor 322 having access to memory 324. The memory may include the exemplary sensor calibration algorithms 326 of the present invention, together with other programs and parameters; after calibration of the sensor, the memory may also contain calibration data 328 for the sensor.

The controller 320 typically generates print data for each carriage assembly 342 of the printer, and also controls other printer mechanisms 332, such as, for example, controlling the drum rotation, paper feeding mechanism, and media dryers (not shown). The controller also interfaces with the compact optical sensor 100, controls it's positioning on the print drum and the optical stimulus generated by the sensor, and acquires measurements from the sensor, as discussed below.

Figure 4:
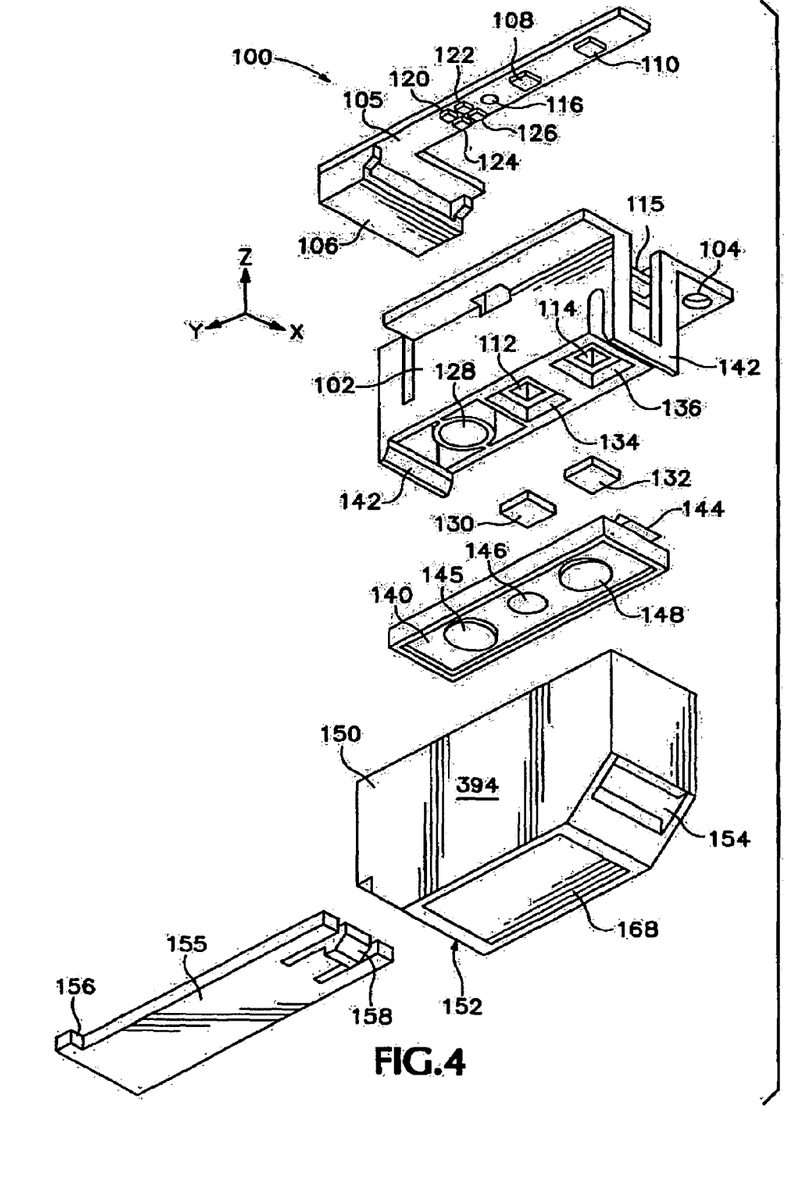
FIG. 4 is a bottom perspective view of an exemplary compact optical sensor which may be utilized in embodiments of the invention.
Figure 5:
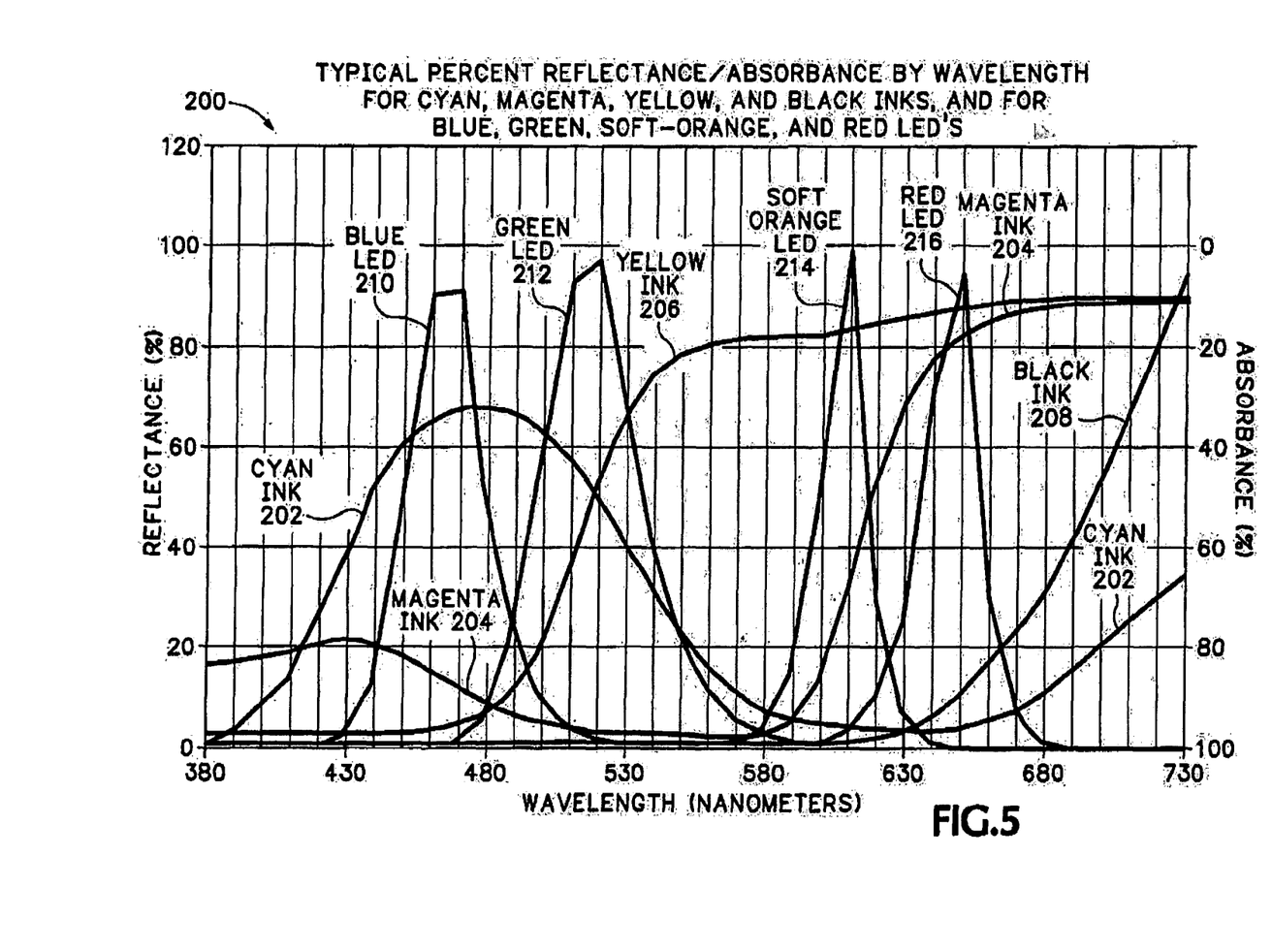
FIG. 5 is a side elevational sectional view of the exemplary compact optical sensor of FIG. 4, shown monitoring a portion of a sheet of print media, such as paper.
Figure 6:
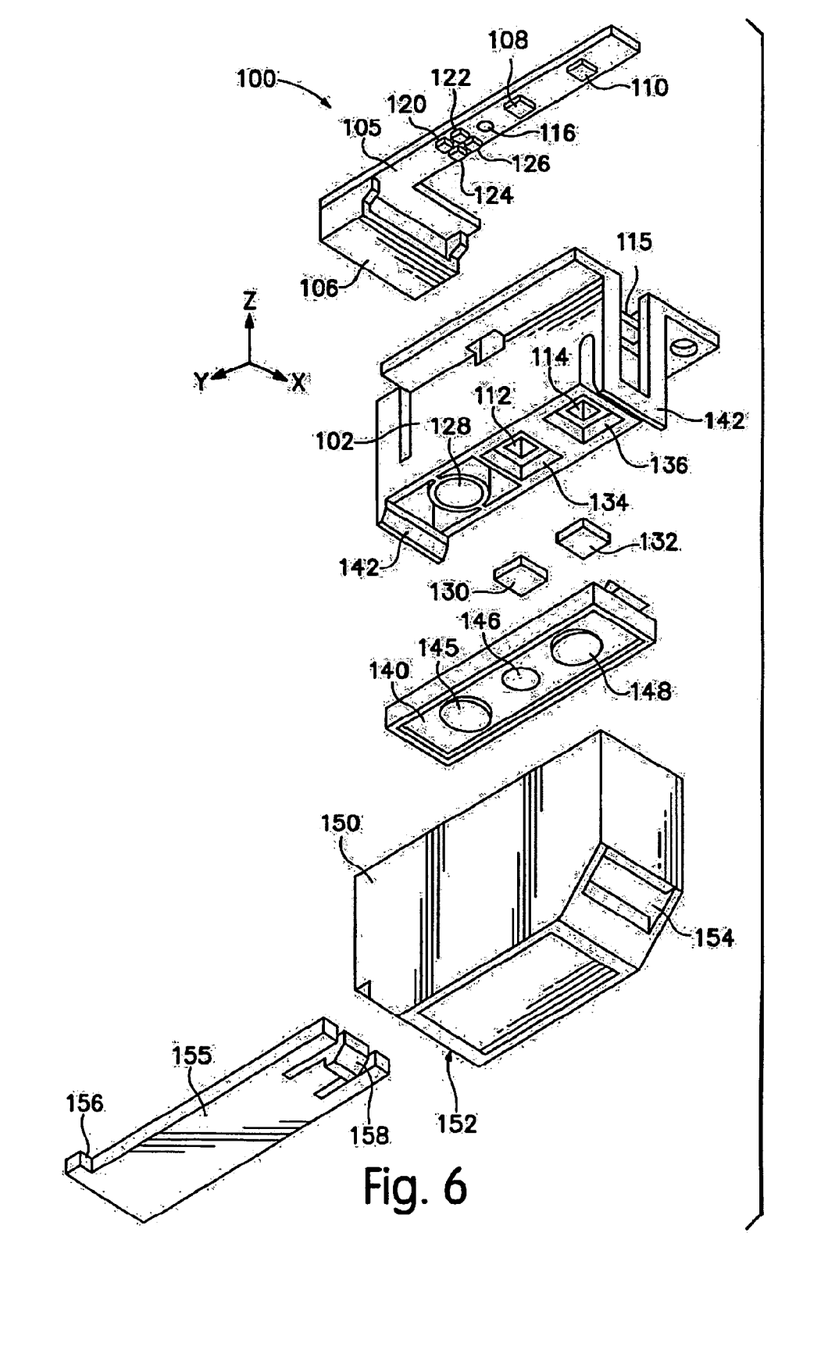
FIG. 6 is an exploded view of the exemplary compact optical sensor of FIG. 4.
Figure 7:
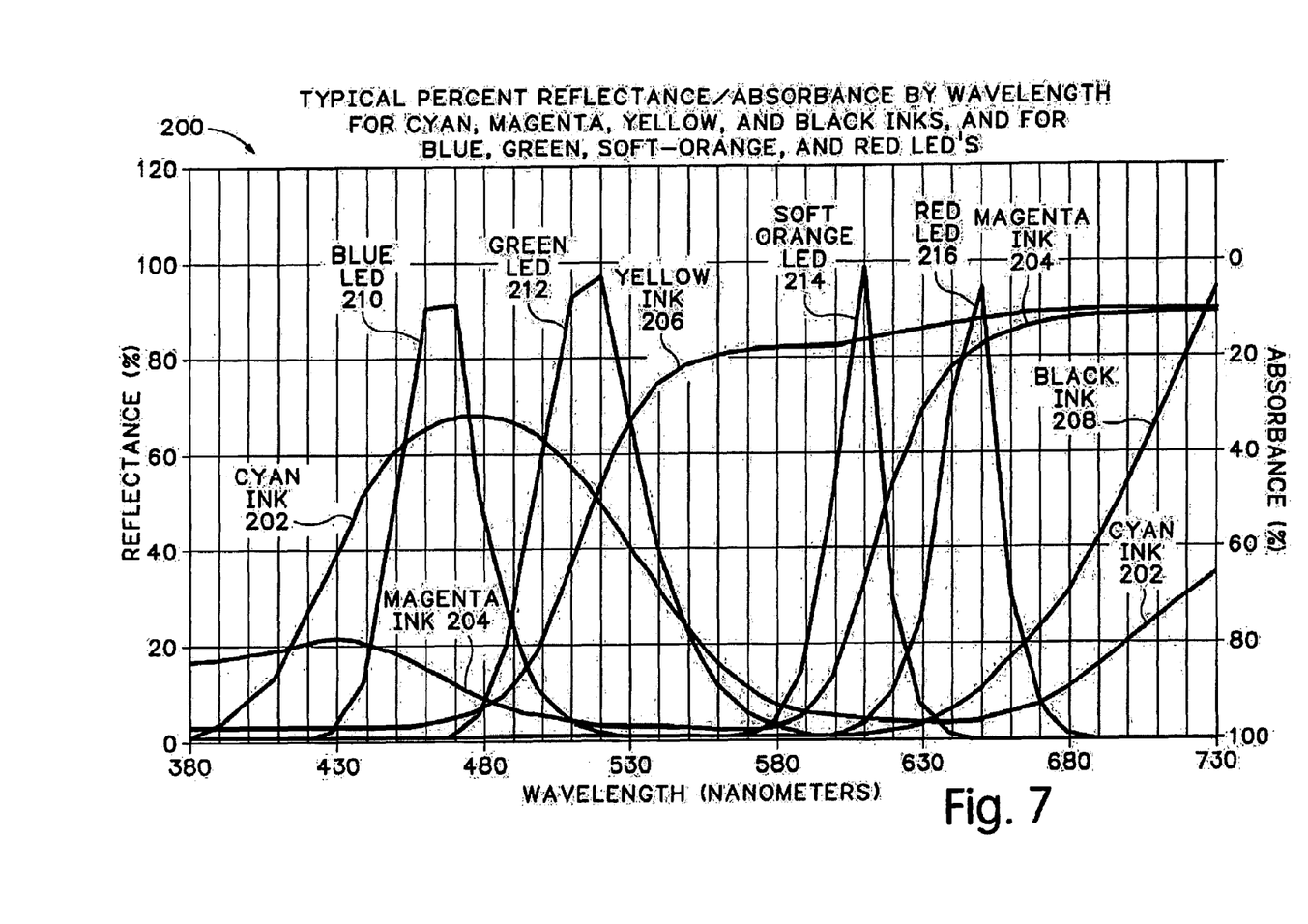
FIG. 7 is a graph showing the relative specular reflectances and specular absorbances versus illumination wave length for cyan, yellow, magenta and black inks, and for blue, green, soft-orange and red illuminating Light emitting diodes (LEDs) used by the exemplary optical sensor of FIG. 4 when monitoring images printed on white media, such as plain paper.

Shown in FIG. 4, and in greater detail in FIGS. 5 through 7, is an exemplary compact optical sensor system 100. The optical sensor 100 includes a housing or frame 102. The sensor 100 also includes a printed circuit assembly ("PCA") 105 (see FIGS. 5 and 6), having a connector receptacle 106 that communicates with controller 320 via, for instance, conventional flexible cables (107). The PCA 105 includes two light-to-voltage converters, or photodiodes 108, 110 for receiving diffuse and specular reflected light, respectively. Preferably, each of the photodiode light-to-voltage converters 108, 110 are identical in construction to provide ease of manufacturing and a more economical, compact optical sensor 100. The output voltage is an analog signal which is passed through an amplifier (not shown). This amplified signal is then passed to an analog-to-digital ("A/D") converter which may be a portion of the printed circuit assembly 105, or a portion of the controller 320.

The PCA board 105 is constructed such that the specular and diffuse photodiodes 108, 110 receive light through incoming light passages 112, 114 defined by the housing 102. To align the photodiodes 108, 110 with the light passages 124, 114, the housing 102 includes a support surface 115, which preferably has a lip, shown to the right of photodiode 110 in FIG. 6, under which the PCA board 105 is received. In the illustrated exemplary embodiment, the PCA board 105 defines an alignment hole 116 therethrough, which when assembled is received upon an alignment post 118 extending upwardly from the housing support surface 115, as shown in FIG. 6.

The PCA board 105 of the exemplary compact optical sensor system includes four light emitting diodes (LEDs) 120, 122, 124 and 126 which, in the illustrated embodiment are the colors, blue, green, red and soft-orange, respectively. The construction of the printed circuit assembly 105 advantageously uses a chip-on-board ("COB") process where the bare silicon die for each component is wire bonded directly to the printed circuit board assembly. Thus, in the illustrated embodiment, the light emitting diodes (LEDs) 120-126 may be closely grouped together, in a space smaller than that occupied by a single-packaged LED. Note that the LEDs 120-126 and photodiodes 108, 110 have been drawn in FIG. 7 to be about twice their normal size to better illustrate the concepts introduced herein. By clustering the light emitting diodes 120-126 so closely, a single outgoing optical light path 128 defined by the housing 102 may accommodate light generated by all of these LEDs.

The illustrated exemplary embodiment may also include two filter elements, one a diffuse filter element 130, and the other a specular filter element 132, preferably of colors selected to block long, infrared wavelengths, although in some implementations, other filters may be used to either filter or pass through more specific wavelength bands. In the illustrated embodiment, the filter elements 130, 132 are typically infrared wavelength blocking filters, such as those designed to block infrared wavelengths between 700 and 1000 nm (nanometers). Each of the filter elements 130, 132 are received within a recessed shelf portion 134, 136 defined by the housing 102. The filter elements 130, 132 serve to limit the incoming light to the diffuse and specular photodiodes 108, 110 to light within the regions of the visible spectrum. In some embodiments, an upper portion of the incoming light passages 112, 114 is molded with a square diffuse stop, and a rectangular specular stop, with the longitudinal axis of the specular stop running perpendicular to the longitudinal axis of the housing 102, that is, parallel with the X-axis. Again, the term "stop" refers to a window through which incoming light passes before it is received by in this case, the specular photodiode 110.

The exemplary compact optical sensor 100 also includes a lens assembly 140, which is received by a pair of lower extremities 142 of the housing 102. In this manner, the filter elements 130, 132 are held in place within recesses 134, 136 by the lens assembly 140. The lens assembly 140 includes an outgoing LED lens 145, and two incoming lenses, here, a diffuse lens 146 and a specular lens 148. The lens elements 145, 146 and 148 are preferably selected to better focus and direct the light beams to follow the paths shown in FIG. 6, and as discussed further below after the remaining components of the optical sensor 100 have been introduced.

Preferably the exemplary sensor 100 includes an ambient light shield member 150. The ambient light shield 150 slides over the lens assembly 140 and is attached to the housing 102, for instance using various snap fitments, bonding elements, such as adhesives, fasteners or the like (not shown). The ambient light shield 150 has a pair of opposing slots 152 and 154 which are located to receive and secure a clear aerosol shield member 155. The aerosol shield 155 in the illustrated embodiment is inserted through slot 152 then through slot 154, with the forward insertion being limited by a stop 156 encountering a portion of the body of the ambient light shield 150 (see FIG. 5). A snap fitment member 158 flexes upwardly during insertion of the aerosol shield 155, then latches down over a lower portion of the slot 154 (see FIG. 5) to hold the aerosol shield 155 in place within the ambient light shield 150. Preferably, the aerosol shield 155 has an anti-reflection coating or property which allows light beams to pass therethrough without undue interference from the aerosol shield 155.

Turning to the operation of the exemplary compact optical sensor 100, as shown in FIG. 5, we see the Light emitting diodes (LEDs) 120, 122, 124, and 126 emitting light beams through the outgoing passageway 128, through the outgoing lens 145, and emerging as light beams 160, 162, 164, and 166, respectively exiting through a light entrance/exit chamber portion 168 of the ambient light shield 150. The emerging light beams 160-166 impact an upper exposed print surface of a sheet of print media 169, such as, for example, a sheet of paper. Light beams 160, 162, 164, and 166 are reflected directly off the media 169 as upwardly directed diffuse light beams 170, 172, 174, and 176, respectively. The term "diffuse" refers to light which is scattered (at any angle) when reflected from a surface. The portion of the diffuse light which is used in the illustrated embodiment are the perpendicular beams reflected off of the media 169, as shown for the diffuse light beams 170-176 in FIG. 5. The incoming diffuse light beams 170-176 pass through lens 146, through filter 130, and through the incoming light chamber 112 and through a rectangular stop or window 178 where they are received by the diffuse photodiode 108. The photodiode 108 is a light-to-voltage converter, as mentioned above, which interprets these incoming diffuse light beams 170-176 and produces a voltage signal proportionate to the intensity of these incoming light beams. This voltage signal is sent via receptical 106 and cable 107, and ultimately to controller 320, where this information may then be used by the controller to adjust various printing parameters.

Besides forming diffuse light beams 170-176, the incoming light beams 160, 162, 164 and 166 reflect off of the media 169 to form incoming specular light beams 180, 182, 184 and 186, respectively. The specular light beams 180-186 are reflected off of the media 169 at the same angle as the incoming light beams 160-166 impacted the media 169, (i.e., the angle of incidence equals angle of reflection). In the illustrated embodiment, preferably the irradiance from each illuminating LED 120-126 strikes the print surface plane of the sheet of media 169 at an angle of about 45-65°, or more preferably at an angle of 45°, referenced from the print surface of the media 169.

The specular reflectance light beams 180-186 pass through the light chamber 168 of the ambient light shield 150, through the aerosol shield 155, through the incoming specular lens 148, through the specular filter element 132, through the incoming light passageway 114, then through a specular stop window 187, after which they are received by the specular photodiode 110. The photodiode 110, which is a light-to-voltage converter, interprets the incoming light beams 180-186 and sends a signal to the controller 320.

The use of four different colors of light emitting diodes 120-126 permits the exemplary compact optical sensor 100 to perform media type sensing, color calibration (specifically, color, hue and intensity compensation), automatic pen alignment and swath height error/linefeed calibration. In the illustrated embodiment, the diffuse reflectance beams 170-176 detect the presence of the primary inks used in inkjet printers, such as, cyan, light cyan, magenta, light magenta, yellow and black. The specular light beams 180-186 are used to determine the reflective and other surface properties of the media 169, from which the type of media 169 may be determined, and the print routines then adjusted to match the type of media. Indeed, use of the four different colored Light emitting diodes (LEDs) 120-126 allows the compact optical sensor 100 to collect data which the controller 320 then may map to a three-dimensional color space which correlates to human perception of color. Moreover, while four light emitting diodes 120-126 are illustrated, it is apparent that other implementations may cluster additional LEDs above the outgoing light chamber 128, or another cluster of LEDs may be provided in the region of the specular photodiode 110 on the printed circuit assembly 105, foregoing media type determination in favor of additional color sensing capability.

A further advantage made use of in the optical sensor 100 is the arrangement of the colors of the LEDs 120-126. In the illustrated embodiment, it is preferred to have LED 120 to be a blue color, LED 122 to be a green color, LED 124 to be a red color and LED 126 to be a soft-orange color, with LEDs 120 and 124 being furthest away from the diffuse photodiode 108, and LEDs 122 and 126 being closer to the diffuse photodiode 108. In the illustrated embodiment, using the particular types of LEDs 120-126 and lens 145 selected, this physical arrangement yields an economical and high performance sensor 100.

FIG. 7 is a graph 200 illustrating the manner in which the colors for the LEDs 120-126 were selected, here based upon the colors of ink and their specular responses used in the printer 20. In FIG. 7, the various wavelengths and percentage of reflectance and percentage of absorbance are shown for the four primary colors ejected by a typical printing unit 10 and for the four LEDs 120-126 of sensor 100. For the inks, graph 200 shows a cyan colored ink trace 202, a magenta colored ink trace 204, a yellow colored ink trace 206 and a black color ink trace 208. In the illustrated embodiment, graph 200 shows a blue LED ink trace 210 which is emitted by LED 120, a green LED trace 212 which is emitted by LED 122, a red LED ink trace 216 which is emitted by LED 124, and a soft-orange LED ink trace 214 which is emitted by LED 126.

The selection of the four LED colors was arrived at by an intensive study evaluating reflections from the interaction of a variety of different illuminating colors with each of the test colors. These interactions were either found through laboratory measurements, or by graphical comparisons of the spectral responses of the inks versus the illumination data provided by the manufacturers of the variety of LEDs available. When measuring any particular color sample, each of the four LEDs 120-126 may be illuminated in sequence, with the resulting diffuse light beams 170-176 then being interpreted by the diffuse light-to-voltage converter 108 to find the percentage of reflectance and/or absorbance. By comparing the reflectance values received when illuminated by the different LEDs 120-126, the various shades may be distinguished by controller 320. For instance, turning to FIG. 7, the cyan ink curve 202 may be distinguished from the other ink curves because the blue LED generates maximum reflectance, the green LED a medium reflectance, and the soft orange and red LEDs generate minimal reflectances. For the magenta ink curve 204, the blue LED generates a small reflectance, the green LED generates a minimal reflectance, the orange LED generates a medium reflectance, while the red LED generates a high reflectance.

The sensor described with respect to FIGS. 4 through 7 may provide relatively high resolution densitometer readings, but may be somewhat inadequate as spectrometer, in that noise in the sensor readings, sensor drift over time, and the contribution of the print media to the sensor readings may affect the resulting measurements.

Figure 8:
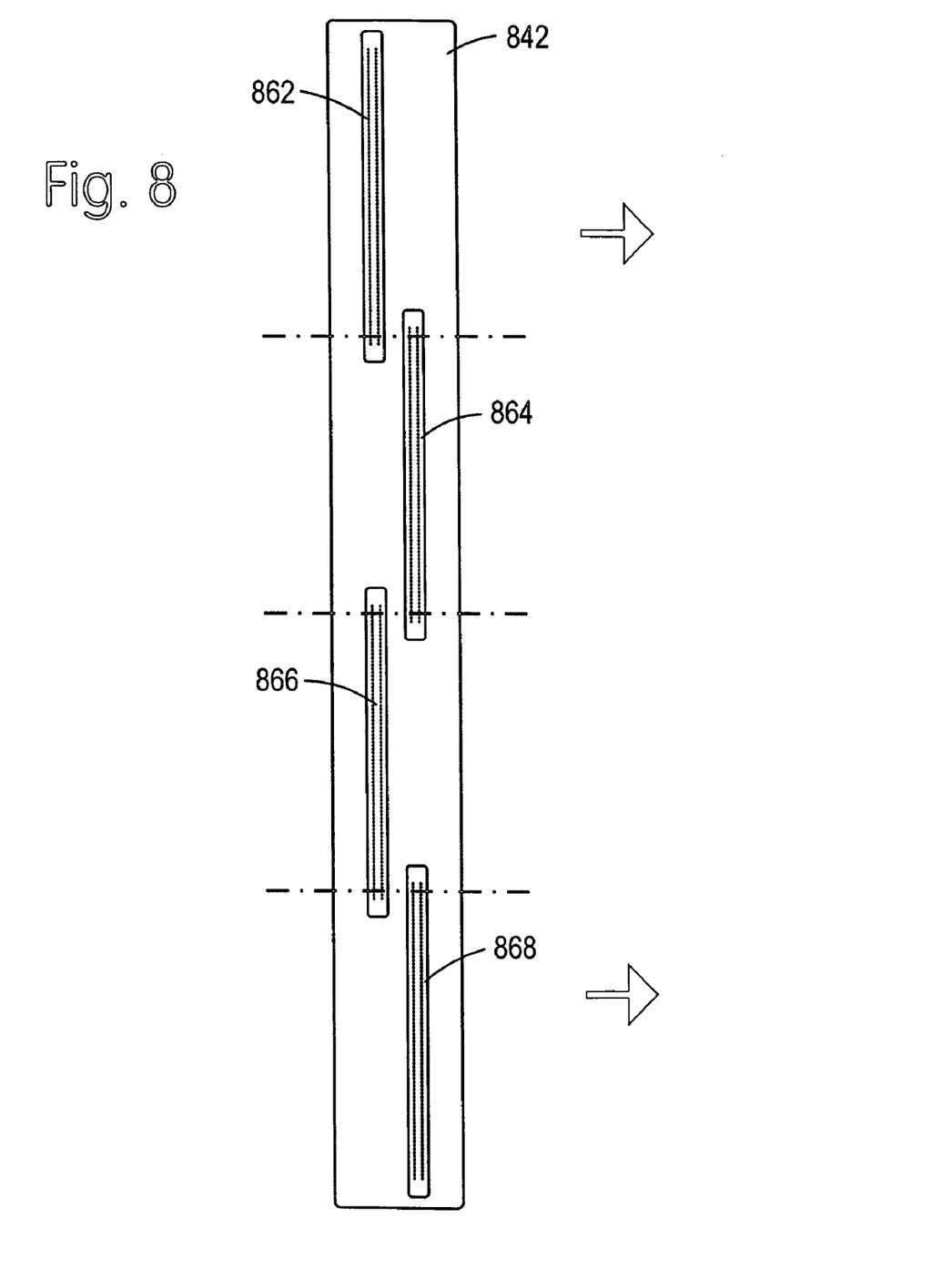
FIG. 8 illustrates in a simplified form how multiple printhead die are arrayed within an exemplary printhead assembly.

FIG. 8 illustrates in simplified form how multiple printhead die 862, 864, 866, 868 are arrayed within a printhead assembly 842. Each of the printhead die 862, 864, 866, 868 is shown having two linear arrays of print nozzles, such as might be used to print two different ink colors. A printhead assembly may include die for printing multiple ink colors or printing fluids, such as, for example, cyan, magenta, yellow, black, and fixer. The individual die are arrange in a staggered pattern perpendicular to the direction of the media transport (indicated by the arrows). As indicated by the dashed lines, each printhead die overlaps the span of the adjacent dies by a small amount (i.e., there is a region near the ends of adjacent die where the rows of nozzles of the adjacent die overlap). Although FIG. 8 illustrates a printhead having four die, other number of die are possible; an exemplary page-wide printer may, for example, have two printhead assemblies with each printhead assembly comprising five die, each die printing two colors of ink.

Figure 9:
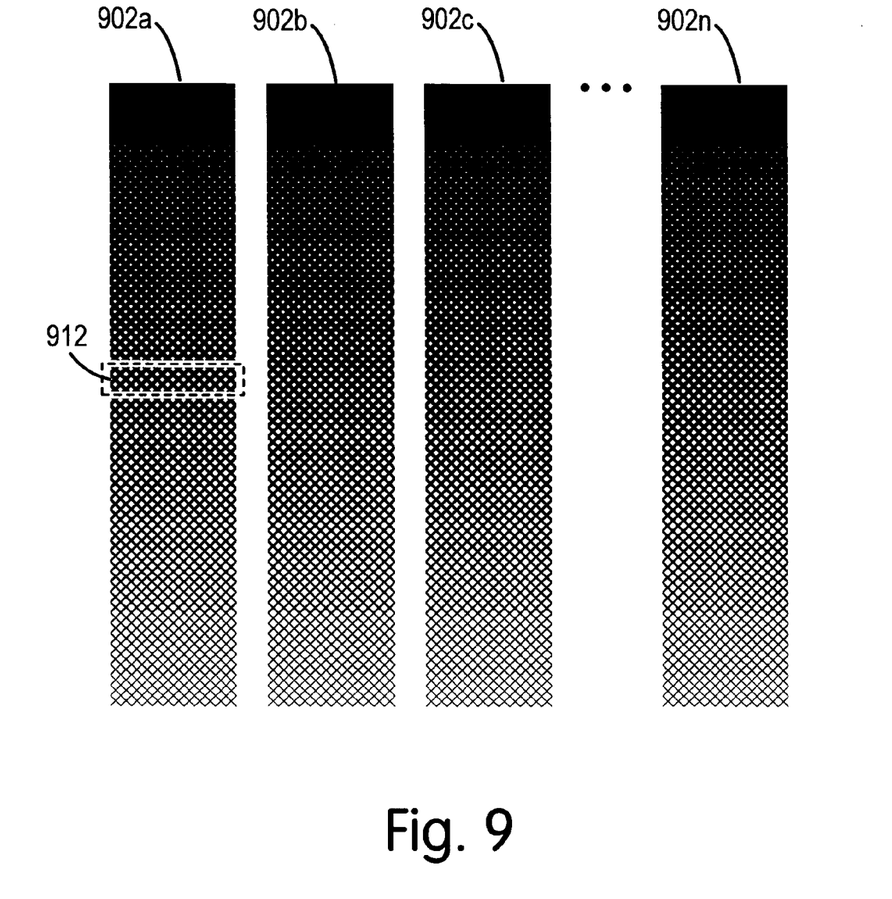
FIG. 9 illustrates how ramps of varying print density may be deposited on a print media by multiple printhead die according to an exemplary embodiment.

FIG. 9 illustrates how "ramps" of varying print density may be deposited on a print media by each die of a multi-die printing system, such as the die 862, 864, 866, 868 of FIG. 8. FIG. 9 is intended to be illustrative only, and does not necessarily represent ramps printed by a actual system. FIG. 9 shows how multiple density ramps 902a through 902n may be printed in parallel; for example, separate ramps may be printed for each of the printhead die which print the same ink color, and for each of the multiple color inks of a printhead die, in a parallel arrangement. An exemplary ramp may include regions printed with discrete print densities equally spaced along the range of available "raw" print densities (such as, for example, seventeen discrete densities), or some other pattern that facilitates later measurement. After printing, the ramps may be repeatedly moved past the compact optical sensor 100, as the drum 18 of the exemplary printing system rotates the media past the sensor.

Exemplary calibration of a color sensor may include a first generic calibration, intended to substantially convert sensor measurements to a standard color space, such as a colorimetric color space (such as CIELab, CIEXYZ, or Optical Density), and a second calibration to substantially eliminate or reduce sensor-to-sensor variations. The first generic calibration may be performed on a large sample of printing systems and sensors to generate calibration data that is approximately correct for all sensors; the generic calibration factors may then be stored in the memory of each printer system produced. The generic calibration allows the "raw" measurements from the sensor to be converted to data representing the colorimetric color space. Since the generic calibration typically accounts for the non-linear sensor response with respect to the colorimetric color space, look-up tables (LUTs) may be employed to allow greater flexibility in mapping the non-linear response curves. The generic calibration may be based on a large number of measurements such as are used for the second calibration as discussed below, made on a large number of actual printing systems; or may comprise other methods known in the art, such as the use of specialized test instrumentation, such as may be available in a laboratory setting. The first calibration may essentially be performed a single time for all sensors, or for a group of sensors, such as those comprising a sensor production run.

The second calibration to substantially eliminate or reduce sensor-to-sensor variations may typically be performed at any time subsequent to the generic calibration, such as when a new printing system is initially installed, at a later time when sensor drift may make recalibration desirable, or when optimal printer performance is desired. The second calibration comprises printing test patches, such as the ramps of FIG. 9, and repeatedly scanning the test patches past the sensor being calibrated. The test patches may be scanned past the sensor by retaining the print media on the drum and rotating the print drum past the sensor; the sensor may be moved side-to-side by moving the print carriage, allowing the different parallel test patches to accessed and measured. In measuring the colors of the test patches, the measurements typically would be adjusted by the data derived from the first calibration, such the resulting values represented the calorimetric values, rather than "raw" sensor data.

Repeated measurements may be made of each region of a printed ramp, such as shown at 912 in FIG. 9, to allow the use of statistical methods, such as averaging of the measurements, to reduce noise. Data may typically be acquired for multiple print densities (such as, for example, seventeen—see FIG. 9) for each printhead die which prints a particular color ink (such as, for example four—see FIG. 8), with the acquired data comprising measurements from multiple print drum rotations. The multiple measurements of multiple test patches also serve to reduce the effect of non-uniformity of the print media upon which the test patches are printed. Data from multiple printheads may reduce the effect of die-to-die variation on the final calibration data. After data is acquired for all print densities and all printhead die for a particular ink color, data-fitting methods may be utilized to determine calibration coefficients which may be stored in a non-volatile memory of the printer. The data-fitting methods may, for example, include methods such as "least squares" analysis, or other methods known in the art. Other analytical methods may also be employed to insure data quality, such as consistency checks to insure that the curve for a printhead with a "light" dropweight is always "lighter" than the curve for a printhead with a "heavy" dropweight.

Splitting the calibration into a first non-linear calibration and a second substantially linear calibration may allow for reduced memory requirements, as the non-linear first calibration may be modeled utilizing look-up tables (LUTs), and the more linear second calibration may be modeled with curve fitting and the generation of calibration curve coefficients. The total memory required to store both the generic calibration LUT and the sensor-to-sensor variation curve coefficients may be substantially less that would be required for a single large calibration LUT or list of coefficients.

Figure 10:
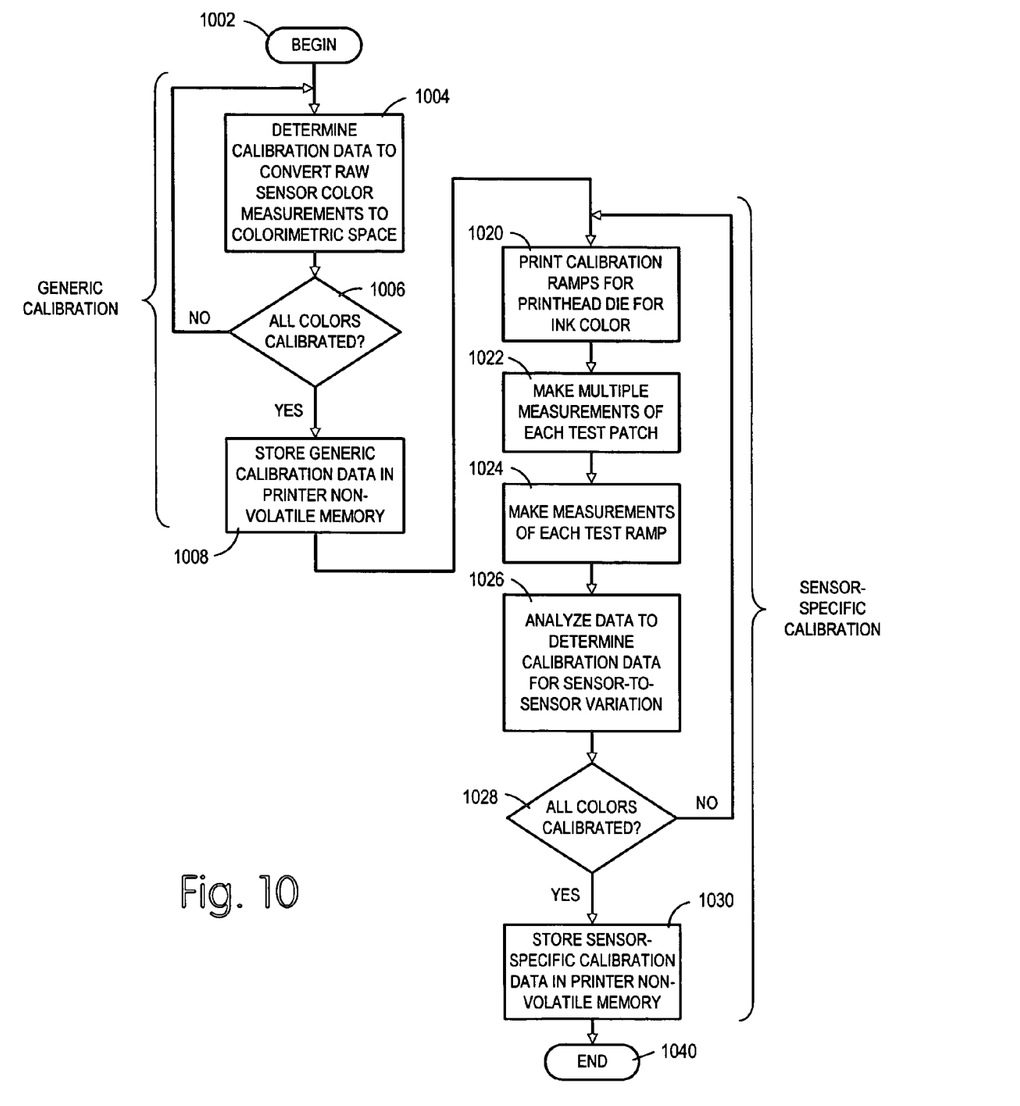
FIG. 10 is a flow chart further illustrating an exemplary embodiment.

FIG. 10 is a flowchart further illustrating an exemplary method. The method begins 1002 and the "generic" calibration is performed, which allows the "raw" sensor measurements to be converted to a colorimetric space. Determining the calibration data 1004 may be done according to known calibration procedures, and is typically done to provide an approximate correction for a group of similar sensors, such as a production run. When all colors have been calibrated 1006, the generic calibration data is typically stored 1008 in a non-volatile memory of the printer system (although other methods of making the calibration data available to the printer are possible). The generic calibration data maps the non-linear response of a "typical" sensor to a calorimetric data space.

The sensor-specific calibration is an in-system calibration of the color sensor which further corrects for sensor-to-sensor variation between printing systems. In a printing system with multiple printhead dies for printing each color, calibration patterns are printed 1020 from each die. These patterns may take the form of density ramps comprised of multiple patches printed at different densities. To reduce measurement noise, multiple measurements may be made of each test patch 1022, such as by repeatedly scanning the print media past the color sensor using a print drum. The multiple measurements may be averaged or combined in some other method, which may include checks for data consistency. The ramps printed by multiple print die printing the same color may be measured 1024, such as by moving the sensor along a print carriage to position it with respect to the ramps as the ramps are scanned past the sensor. Once data is accumulated, the data is analyzed 1026 to compute calibration data for that color. The computation may include known analysis techniques and data consistency checks. When all colors are calibrated 1028, the sensor-specific information may be stored 1030 in non-volatile memory of the printing system, or otherwise made available to the printing system. The exemplary method then ends 1040.

The above is a detailed description of particular embodiments of the invention. It is recognized that departures from the disclosed embodiments may be within the scope of this invention and that obvious modifications will occur to a person skilled in the art. It is the intent of the applicant that the invention include alternative implementations known in the art that perform the same functions as those disclosed. This specification should not be construed to unduly narrow the full scope of protection to which the invention is entitled. Embodiments of the invention include computer readable media containing program instructions for implementing the exemplary methods.

The corresponding structures, materials, acts, and equivalents of all means or step plus function elements in the claims below are intended to include any structure, material, or acts for performing the functions in combination with other claimed elements as specifically claimed.

What is claimed is:

1. A method of calibrating a color sensor in a printing system, the method comprising:
    performing a first non-linear calibration to substantially map the sensor to a standard color space;
    performing a second substantially linear calibration to reduce sensor-to-sensor variation;
    acquiring data for the second substantially linear calibration for multiple print densities of plural printheads of the printing system, wherein each printhead is configured to print a particular color of ink and the acquired data includes measurements from multiple print drum rotations;
    using the acquired data for the multiple printheads and the measurements to reduce effects of variations between printheads; and
    performing analytical data consistency checks for each printhead to control dropweight errors between the plural printheads.

2. The method of calibrating a color sensor in a printing system of claim 1, wherein the second calibration comprises acquiring measurements from the sensor for test patches printed by a plurality of printheads.

3. The method of calibrating a color sensor in a printing system of claim 2, wherein the second calibration comprises acquiring multiple measurements from the sensor for each test patch and applying statistical methods to the multiple measurements to reduce noise.

4. The method of calibrating a color sensor in a printing system of claim 3, wherein the statistical methods comprise averaging the multiple measurements.

5. The method of calibrating a color sensor in a printing system of claim 1, wherein the print drum is configured to retain media and repeatedly scan the print media past the color sensor.

6. The method of calibrating a color sensor in a printing system of claim 1, further comprising storing first calibration data and second calibration data in a printer non-volatile memory.

7. The method of calibrating a color sensor in a printing system of claim 6, wherein the first calibration data comprises a look-up-table.

8. The method of calibrating a color sensor in a printing system of claim 6, wherein the second calibration data comprises coefficients representing a calibration curve.

9. The method of calibrating a color sensor in a printing system of claim 1, wherein the standard color space is a colorimetric color space.

10. The method of calibrating a color sensor in a printing system of claim 9, wherein the colorimetric color space is selected from the group consisting of CIELab, CIEXYZ, and Optical Density.

11. A method of calibrating a color sensor in a printing system, the printing system having a drum to retain a print media and repeatedly scan the print media past the color sensor, the method comprising:
    performing a first non-linear calibration to substantially map the sensor to a standard color space;
    storing first non-linear calibration information in a printer non-volatile memory;
    printing test patches on the print media;
    repeatedly scanning the print media past the color sensor while acquiring data;
    analyzing the acquired data to determine second substantially linear calibration information;
    storing the second substantially linear calibration information in the printer non-volatile memory;

acquiring data for the second substantially linear calibration for multiple print densities of plural printheads of the printing system, wherein each printhead is configured to print a particular color of ink and the acquired data includes measurements from multiple print drum rotations;

using the acquired data for the multiple printheads and the measurements to reduce effects of variations between printheads; and performing analytical data consistency checks for each printhead to control dropweight errors between the plural printheads.

12. A printing system, comprising:

a print drum for holding print media to be rotated past a print carriage, and past a repositionable color sensor;

a processor including non-volatile memory, the non-volatile memory containing first non-linear calibration data for mapping color sensor measurements to a standard color space, and second substantially linear calibration data for correcting for sensor variation, wherein the processor acquires data for the second substantially linear calibration for multiple print densities of plural print cartridges, wherein each print cartridge is configured to print a particular color of ink, wherein the acquired data includes measurements from multiple rotations of the print drum, wherein the acquired data for the multiple print cartridges and the measurements are used to reduce effects of variations between print cartridges, and wherein analytical data consistency checks for each cartridge is performed by the processor to control dropweight errors between the plural cartridges.

13. The printing system of claim 12, wherein the repositionable color sensor is attached to the print carriage.

14. The printing system of claim 12, wherein the first calibration data for mapping the color sensor measurements to a standard color space maps the measurements to a colorimetric color space.

15. The printing system of claim 12, wherein the non-volatile memory further includes instructions for printing test patches on print media.

16. The printing system of claim 15, wherein the test patches comprise printed ramps with discrete patches of different print densities.

17. The printing system of claim 12, wherein the non-volatile memory further includes instructions for controlling the print drum to repeatedly rotate media past the sensor while taking multiple readings, and instructions for analyzing the multiple readings to generate the second calibration data.

18. A computer readable media containing program instructions for calibrating a color sensor in a printing system, the printing system having a print drum for holding print media and rotating the media past a print carriage and a color sensor, the instructions comprising:

instructions to perform a first non-linear calibration to substantially map the sensor to a standard color space;

instructions to perform a second substantially linear calibration to reduce sensor-to-sensor variation;

instructions to acquire data for the second substantially linear calibration for multiple print densities of plural printheads of the printing system, wherein each printhead is configured to print a particular color of ink and the acquired data includes measurements for multiple print drum rotations;

instructions to use the acquired data for the multiple printheads and the measurements to reduce effects of variations between printheads; and instructions to perform analytical data consistency checks for each printhead to control dropweight errors between the plural printheads.

19. The computer readable media containing program instructions of claim 18, the printing system further comprising the color sensor attached to the print carriage for repositioning of the color sensor, and wherein the instructions for repeatedly rotating print media past the color sensor while making multiple color sensor readings comprise:

instructions to make multiple sensors readings with the sensor positioned at a first location;

instructions to reposition the color sensor; and instructions to make multiple sensor readings with the sensor positioned at a second location.

* * * * *

UNITED STATES PATENT AND TRADEMARK OFFICE
CERTIFICATE OF CORRECTION

| | | |
|---|---|---|
| PATENT NO. | : 7,537,304 B2 | Page 1 of 1 |
| APPLICATION NO. | : 11/413292 | |
| DATED | : May 26, 2009 | |
| INVENTOR(S) | : Yifeng Wu et al. | |

It is certified that error appears in the above-identified patent and that said Letters Patent is hereby corrected as shown below:

In column 9, line 27, delete "calorimetric" and insert -- colorimetric --, therefor.

In column 10, line 34, in Claim 5, after "retain" insert -- print --.

Signed and Sealed this

Fifteenth Day of September, 2009

David J. Kappos
*Director of the United States Patent and Trademark Office*